(12) United States Patent
Jimenez et al.

(10) Patent No.: US 12,336,666 B2
(45) Date of Patent: *Jun. 24, 2025

(54) FOOD PREPARATION APPLIANCE FOR USE WITH A REMOTE COMMUNICATION DEVICE

(71) Applicant: Spectrum Brands, Inc., Middleton, WI (US)

(72) Inventors: Rolando Antonio Cavazos Jimenez, Middleton, WI (US); Joseph V. Krebs, Madison, WI (US); James Stuart Saunders, Fitchburg, WI (US); Emily Van Haren, Fitchburg, WI (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,577

(22) Filed: Nov. 29, 2023

(65) Prior Publication Data

US 2024/0206681 A1 Jun. 27, 2024

Related U.S. Application Data

(63) Continuation of application No. 17/592,580, filed on Feb. 4, 2022, now Pat. No. 11,864,692, which is a
(Continued)

(51) Int. Cl.
*A47J 43/046* (2006.01)
*A47J 36/32* (2006.01)
(Continued)

(52) U.S. Cl.
CPC ........... *A47J 43/046* (2013.01); *A47J 36/321* (2018.08); *A47J 43/07* (2013.01); *A47J 43/0716* (2013.01);
(Continued)

(58) Field of Classification Search
CPC ....... A47J 43/026; A47J 43/07; B01F 35/2117
(Continued)

(56) References Cited

U.S. PATENT DOCUMENTS 5,329,069 A * 7/1994 Amsel ................... A47J 43/046
177/245
5,799,567 A 9/1998 Dorner
(Continued)

FOREIGN PATENT DOCUMENTS

CN 101940433 A 1/2011
CN 103759802 A 4/2014
(Continued)

OTHER PUBLICATIONS

International Search Report and Written Opinion for Application No. PCT/US2015/020542 mailed Jun. 26, 2015.
(Continued)

*Primary Examiner* — Marc C Howell
(74) *Attorney, Agent, or Firm* — Merchant & Gould P.C.

(57) ABSTRACT

One example food preparation appliance includes a base having a motor and an adaptor, a weight sensor coupled to the adaptor, and a communication component. The adaptor is configured to support a food preparation accessory. The weight sensor is configured to detect a weight applied to the adaptor. The communication component is configured to transmit data associated with a weight detected by the weight sensor. An example remote communication device includes a display device, a processor; and a memory coupled to the processor. The remote communication device is configured to display a first instruction on the display device, the first instruction including a first target weight of a first substance; receive a measurement from a food preparation appliance indicative of a weight applied to an adaptor of the food preparation appliance; and display a second
(Continued)

instruction when the weight is substantially equal to the first target weight.

19 Claims, 9 Drawing Sheets

Related U.S. Application Data continuation of application No. 14/657,439, filed on Mar. 13, 2015, now Pat. No. 11,272,810.

(60) Provisional application No. 61/953,073, filed on Mar. 14, 2014.

(51) Int. Cl.
| | | |
|---|---|---|
| *A47J 43/07* | (2006.01) | |
| *G06Q 10/10* | (2023.01) | |
| *G06Q 50/10* | (2012.01) | |
| *G09B 19/00* | (2006.01) | |

(52) U.S. Cl.
CPC ............ *G06Q 10/10* (2013.01); *G06Q 50/10* (2013.01); *G09B 19/0092* (2013.01); *A47J 2043/0733* (2013.01)

(58) Field of Classification Search
USPC ........................................................ 366/141
See application file for complete search history.

(56) References Cited

U.S. PATENT DOCUMENTS

| | | |
|---|---|---|
| 6,587,739 B1 | 7/2003 | Abrams et al. |
| 8,442,674 B2 | 5/2013 | Tilton et al. |
| 8,829,365 B1 | 9/2014 | Wallace et al. |
| 9,355,096 B1 | 5/2016 | Brahmbhatt et al. |
| 2004/0267382 A1 | 12/2004 | Cunningham et al. |
| 2005/0068847 A1* | 3/2005 | Sands ................. A47J 43/0716 366/205 |
| 2008/0198688 A1* | 8/2008 | Peng ....................... B01F 27/88 366/147 |
| 2011/0100504 A1* | 5/2011 | Saranow ............... B01F 33/848 141/83 |
| 2011/0220425 A1 | 9/2011 | Denk et al. |
| 2012/0285986 A1 | 11/2012 | Irvin |
| 2012/0286080 A1 | 11/2012 | Sladecek |
| 2012/0321760 A1 | 12/2012 | Xie |
| 2013/0003490 A1 | 1/2013 | Kemker et al. |
| 2013/0260345 A1 | 10/2013 | Puri et al. |
| 2014/0081777 A1 | 3/2014 | Mastrodonato et al. |
| 2014/0089231 A1 | 3/2014 | Jhunja et al. |

FOREIGN PATENT DOCUMENTS

| | | | |
|---|---|---|---|
| DE | 202005021501 U1 | 6/2008 | |
| DE | 102009007733 A1 | 8/2010 | |
| DE | 102010026304 B4 | 1/2012 | |
| DE | 202012102486 U1 | 8/2012 | |
| EP | 1 880 647 A1 | 1/2008 | |
| EP | 2365303 A1 | 9/2011 | |
| EP | 2 519 129 B1 | 5/2013 | |
| EP | 2647916 A1 | 10/2013 | |
| GB | 2434740 A | 8/2007 | |
| GB | 2435411 A | 8/2007 | |
| GB | 2436876 A | 10/2007 | |
| GB | 2440166 A * | 1/2008 | .......... A47J 43/0727 |
| GB | 2521335 A | 6/2015 | |
| WO | WO-2014021710 A2 * | 2/2014 | ............ A47J 27/004 |
| WO | 20140144814 A2 | 9/2014 | |

OTHER PUBLICATIONS

European Patent Office, Supplementary European Search Report, mailed Nov. 15, 2017, 10 pages.

* cited by examiner

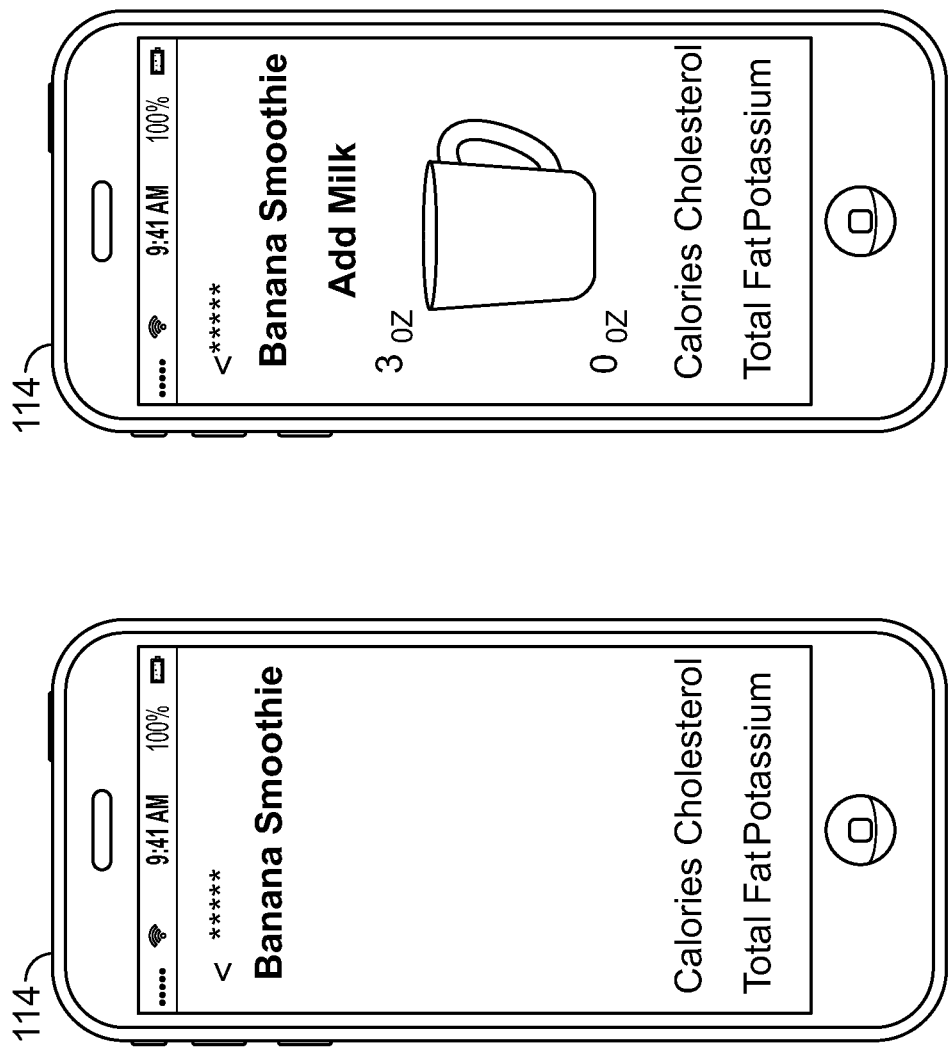

FOOD PREPARATION APPLIANCE FOR USE WITH A REMOTE COMMUNICATION DEVICE

CROSS REFERENCE TO RELATED APPLICATION(S)

This application is a continuation of U.S. application Ser. No. 17/592,580, filed on Feb. 4, 2022, which is a continuation of U.S. application Ser. No. 14/657,439, filed on Mar. 13, 2015, titled FOOD PREPARATION APPLIANCE FOR USE WITH A REMOTE COMMUNICATION DEVICE, which claims priority to U.S. Application Ser. No. 61/953,073, filed on Mar. 14, 2014, titled FOOD PREPARATION APPLIANCE FOR USE WITH A REMOTE COMMUNICATION DEVICE, the disclosures of which are hereby incorporated by reference in their entireties. To the extent appropriate, a claim of priority is made to each of the above-disclosed applications.

FIELD OF THE DISCLOSURE

The present disclosure generally relates to food preparation appliances. More specifically, the present disclosure relates to kitchen appliances, such as blenders, mixers, food processors, and scales, and portable electronic devices, such as mobile phones, portable computers, tablet computers, personal digital assistants, etc.

BACKGROUND OF THE DISCLOSURE

Food preparation appliances, such as food processors, mixers, blenders, and the like, are often used with ingredients that may need to be weighed and/or measured for use in, for example, a recipe. A user may separately measure and/or weigh ingredients using a scale or measuring cups. Some food preparation appliances include measurement markings located on containers to reduce the need for separately measuring ingredients. Often, such markings are difficult to see and/or to read. Moreover, it may be difficult to use the markings when more than one ingredient needs to be added. The difficulty of using the measurement markings on the containers may lead to a user adding an inaccurate amount of an ingredient to the container or unnecessarily using a separate measurement device.

Food preparation appliances sometimes include a display for providing limited information to a user of the appliance. For example, the display may indicate the speed at which the device is operating. The display may be an electronic display, such as a liquid crystal display (LCD) or a series of one or more indicator lights, or a physical display, such as speed markings beside a control lever and/or selection buttons. Such displays may, however, provide limited information to a user of the appliance and require a user to be close to the appliance, i.e., close enough to read the display, to receive any information from the appliance.

It may be advantageous to provide a user with systems, methods, and computer-readable media to provide information to a user of a food preparation appliance locally and or remotely, and/or to help a user more easily determine an amount of an ingredient in a container of a kitchen appliance.

SUMMARY

In one aspect of the present disclosure, a food preparation appliance has a base and a weight sensor. The base of the food preparation appliance includes a motor and an adaptor, where the adaptor is configured to support a food preparation accessory. The weight sensor is coupled to the adaptor and configured to detect a weight applied to the adaptor.

In one aspect of the present disclosure, a food preparation appliance has a base, a weight sensor, and a communication component. The base of the food preparation appliance includes a motor and is configured to support a food preparation accessory. The weight sensor is coupled to the base and is configured to detect a weight applied to the food preparation accessory. The communication component is configured to transmit data associated with a weight detected by the weight sensor to a remote communication device.

Another aspect of the disclosure is a food preparation appliance for transmitting data associated with a weight to a remote communication device. The food preparation appliance has a base. The base has a motor and an adaptor. The adaptor is configured to support a food preparation accessory. The food preparation appliance also includes a processor coupled to a memory. The memory stores instructions that, when executed by the processor, cause the processor to receive a signal proportional to the weight applied to the adaptor of the food preparation appliance, determine the weight applied to the adaptor of the food preparation appliance based, at least in part, on the signal, and transmit an indication of the weight to the remote communication device.

In another aspect of the disclosure, a food preparation appliance includes a base having a motor and an adaptor. The adaptor is configured to support a food preparation accessory. The food preparation appliance includes a processor and a memory coupled to the processor. The memory stores instructions that, when executed by the processor, cause the processor to receive data related to the food preparation appliance, and transmit the data to a remote communication device.

In yet another aspect of the disclosure, a food preparation appliance includes a base having a motor. The base is configured to support a food preparation accessory. The food preparation appliance includes a processor and a memory coupled to the processor. The memory stores instructions that, when executed by the processor, cause the processor to receive data related to the food preparation appliance, and transmit the data to a remote communication device.

Yet another aspect of the disclosure is a remote communication device for displaying an instruction. The remote communication device has display device, a processor, and a memory coupled to the processor. The memory stores instructions that, when executed by the processor, cause the processor to display a first instruction on the display device. The first instruction includes a first target weight of a first substance. The processor receives a measurement from a food preparation appliance indicative of a weight applied to an adaptor of the food preparation appliance and determines when the weight applied to the adaptor of the food preparation appliance is substantially equal to the first target weight. The processor displays a second instruction associated with the first instruction when the weight applied to the adaptor of the food preparation appliance is substantially equal to the first target weight.

The features, functions, and advantages described herein may be achieved independently in various implementations described in the present disclosure or may be combined in yet other implementations, further details of which may be seen with reference to the following description and drawings.

BRIEF DESCRIPTION OF THE DRAWINGS

FIG. 8D is another exemplary display; and

FIG. 8E is another exemplary display.

Figure 1:
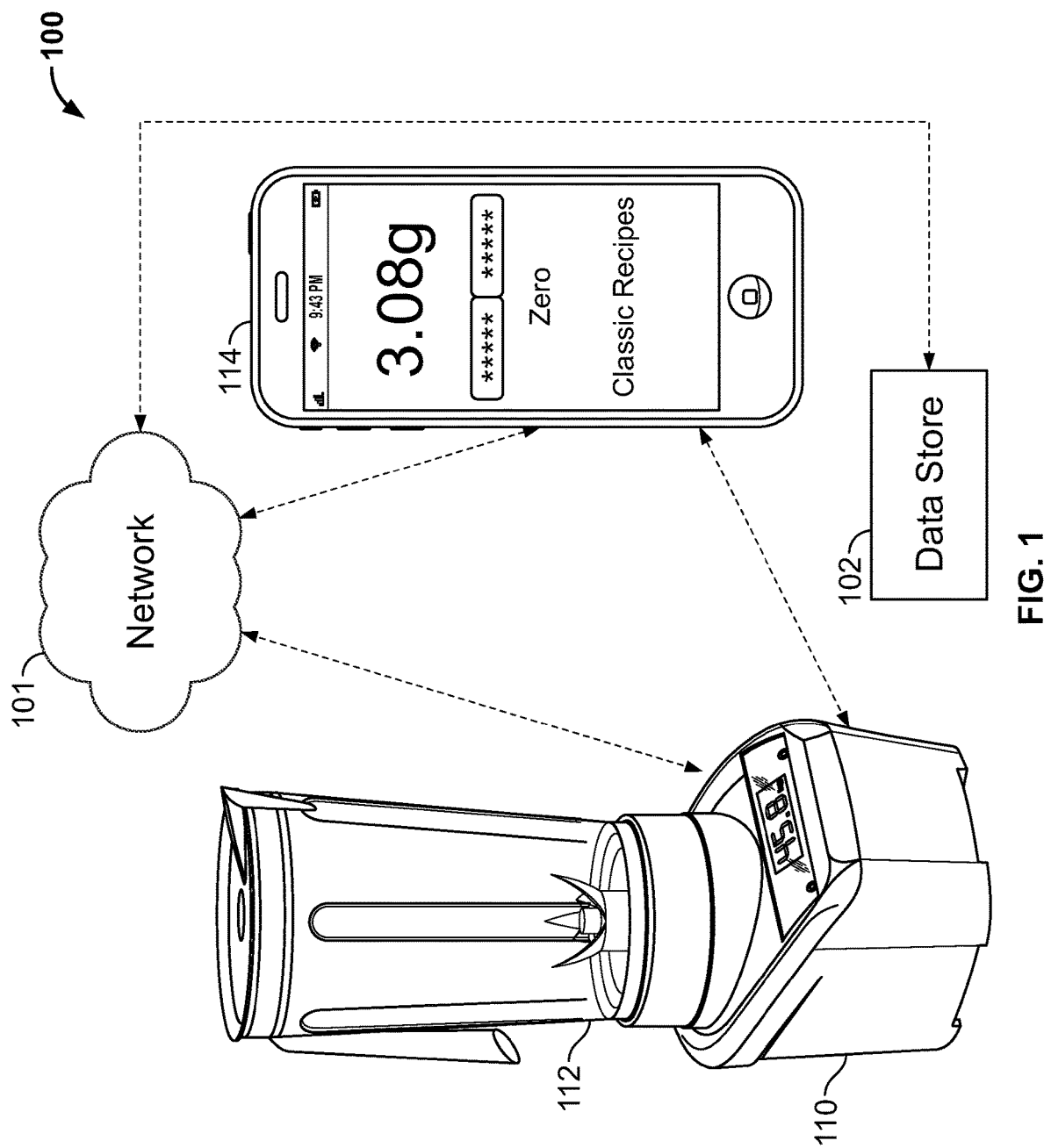
FIG. 1 is an exemplary system having a food preparation appliance and a remote communication device.

Although specific features of various embodiments may be shown in some drawings and not in others, this is for convenience only. Any feature of any drawing may be referenced and/or claimed in combination with any feature of any other drawing. Corresponding reference characters indicate corresponding parts throughout the drawings.

DETAILED DESCRIPTION

The present disclosure generally relates to food preparation appliances that communicate with a remote communication device. In some embodiments, a food preparation appliance sends data to the remote communication device. Exemplary data that may be sent by the food preparation appliance to the remote communication device includes, for example, the weight of a substance added to the appliance, operational data about the appliance (e.g., speed, torque, direction, etc.), and maintenance and/or error data concerning the food preparation appliance. In some embodiments, the remote communication device may remotely control aspects of the food preparation appliance, such as an on and off operation of the food preparation appliance through communication with the food preparation appliance.

More particularly, the present disclosure relates to a food preparation appliance configured to determine a weight applied to a component of the food preparation appliance and to communicate data associated with the weight to a remote communication device. For example, the food preparation appliance may be a blender having a food preparation accessory, such as a container. The blender includes a scale configured to weigh the container and contents within the container. The blender communicates a signal indicating the weight of the container and/or the contents within the container to a remote communication device, such as a mobile phone. Alternatively, the blender may communicate a signal indicating the mass of the container and/or the contents within the container to the remote communication device. In either embodiment, the remote communication device displays to the user of the remote communication device the weight or the mass indicated by the signal. The remote communication device may also calculate and display a weight from the mass or a mass from the weight. Although some appliance within the scope of this disclosure may measure mass and/or calculate weight, for simplicity and clarity, the present disclosure will refer to appliances "weighing" or detecting a "weight."

Additional aspects of the present disclosure relate to interactive instructions and/or recipes. In some embodiments, the remote communication device receives data associated with the weight applied to a component of the food preparation appliance and provides an instruction based, at least in part, on the data associated with the weight. For example, a remote communication device, such as a mobile phone, presents a set of instructions for a recipe, such as a banana smoothie. Each individual instruction may be associated with a specific weight of a substance. For example, a recipe may include instructions to add 10 ounces of milk and then to add 5 ounces of bananas to a container of a food preparation appliance, such as a blender. In such an example, the mobile phone presents the first instruction to a user to add 10 ounces of milk to the container of the blender. Upon the mobile phone receiving an indication from the blender that a weight of 10 ounces has been reached, the mobile phone presents the second instruction to the user to add 5 ounces of bananas to the container of the blender.

In further aspects of the present disclosure, additional data can be sent from the food preparation appliance to the remote communication device, such as a temperature of a component of the food preparation appliance or an ingredient added to the food preparation appliance, a speed of a component of the food preparation appliance, an error message, and the like.

FIG. 1 is an illustration of an exemplary system 100 having a food preparation appliance 110, a food preparation accessory 112, a remote communication device 114, a network 101, and a data store 102. The food preparation appliance 110 is an appliance capable of assisting a user in preparing food. In the illustrated embodiment, the food preparation appliance 110 is a blender. In other embodiments, the food preparation appliance 110 is an appliance capable of chopping, dicing, cutting, weighing, storing, heating, cooling, and/or maintaining a temperature of a food item. In additional embodiments, the food preparation appliance 110 is a mixer, a food processor, or any food preparation appliance having a motor.

A food preparation accessory may be any item capable of being used in conjunction with a food preparation appliance. In the exemplary embodiment, the food preparation accessory 112 is a blender container. In other embodiments, the food preparation accessory 112 is a bowl, a cup, a container, or a pan. In general, the food preparation accessory 112 is any item capable of being attached and removed from at least a portion of the food preparation appliance 110. In some embodiments, the food preparation accessory 112 is an item capable of interacting with a motor (not shown in FIG. 1) of the food preparation appliance 110. In the illustrated embodiment, the food preparation accessory 112 is a blender container having multiple blades (not shown) located within the container proximate a bottom of the container. The container is configured to attach to a component of the food preparation appliance 110 such that the motor may rotate the blades at various speeds based on the operation of the blender base.

A remote communication device, as used herein, is a device that is separate from the food preparation appliance 110 and that is capable of receiving communication from the food preparation appliance 110. In the exemplary embodiment, the remote communication device 114 is a mobile phone. In other embodiments, the remote communication device 114 is a desktop computer, a tablet computer, a television, a radio, a personal digital assistance, and/or a pager. Additionally, in some embodiments, a remote communication device is a device specifically dedicated to the food preparation appliance 110 such that the remote communication device is configured to communicate specifically with the food preparation appliance. Although only one remote communication device is shown in FIG. 1, it is contemplated that more than one remote communication device, including different types of remote communication devices, may be used with system 100.

The food preparation appliance 110 communicates with the remote communication device 114 directly and/or by utilizing network 101. The appliance 110 may communicate directly with the remote communication device 114 using any suitable wired or wireless communication protocol. For example, the food preparation appliance 110 may communicate directly with the remote communication device using, along with appropriate communication protocols, a radio frequency (RF) transceiver, a Bluetooth® adapter, a Wi-Fi transceiver, a ZigBee® transceiver, a near field communication (NFC) transceiver, an infrared (IR) transceiver, and/or any other device capable of communicating directly with remote communication device 114. (Bluetooth is a registered trademark of Bluetooth Special Interest Group of Kirkland, Washington; ZigBee is a registered trademark of the ZigBee Alliance of San Ramon, California.) Wired communication between the food preparation appliance 110 and the remote communication device may use any suitable wired communication protocol including, without limitation, USB, RS232, I2C, SPI, analog, and proprietary I/O protocols.

The network 101 is a communication network. In the exemplary embodiment, the network 101 is a wireless local area network (WLAN). The network 101 may be any suitable type of network and/or a combination of networks. The network 101 may be wired or wireless and of any communication protocol. The network 101 may include, without limitation, the Internet, a local area network (LAN), a wide area network (WAN), a wireless LAN (WLAN), a mesh network, a virtual private network (VPN), a cellular network, and/or any other network that allows system 100 to operate as described herein.

The data store 102 is configured to store data associated with the food preparation appliance 110, the food preparation accessory 112, and/or the remote communication device 114. Such data may include, but is not limited to, measurements, weight data, weights, recipes, types of food preparation accessories, type of food items, types of liquids, error messages, maintenance data, etc. Additionally, the data store is configured to store operational data and statistical data. Operational data includes data associated with the operation of the food preparation appliance and food preparation accessory. Operational data includes a temperature of a food substance and/or component, a speed of a motor or a component, a voltage, and a weight of a component of the food preparation appliance and/or the food preparation accessory. Statistical data includes data associated with the function of the food preparation appliance and food preparation accessory, such as hours the appliance has been operated, number of times cycled on and/or off, error messages, and maintenance data. The data store 102 may also store instructions and/or recipes for use with the food preparation accessory 112. Although a single data store 102 is shown in FIG. 1, system 100 may include one or multiple data stores. The data store 102 may be a standalone data store (e.g., a part of a server connected to network 101), may be located within food preparation appliance 110, and/or may be located within the remote communication device 114.

Figure 2:
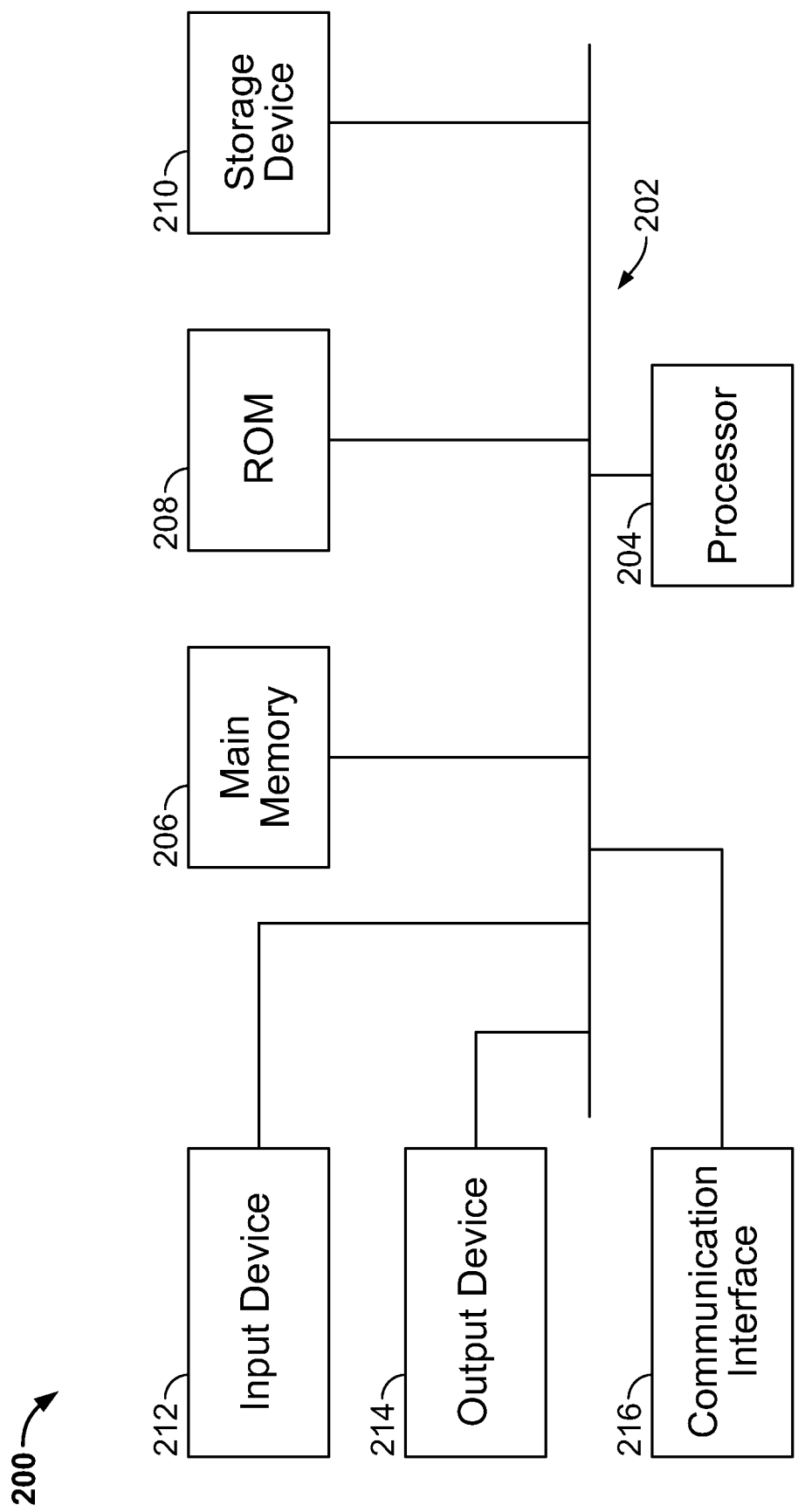
FIG. 2 is an exemplary computing system.

Various embodiments described in this disclosure include computing devices. FIG. 2 shows an example of a generic computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

In the exemplary embodiment, food preparation appliance 110 and remote communication device 114 (shown in FIG. 1) each include a computing device 200. Computing device 200 includes a bus 202, a processor 204, a main memory 206, a read only memory (ROM) 208, a storage device 210, an input device 212, and output device 214, and a communication interface 216. Bus 202 includes a path that permits communication among the components of computing device 200.

Processor 204 includes any type of conventional processor, microprocessor, or processing logic that interprets and executes instructions. Processor 204 can process instructions for execution within the computing device 200, including instructions stored in the memory 206 or on the storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

The storage device 210 is capable of providing mass storage for the computing device 200. Storage device 210 may include a magnetic and/or optical recording medium and its corresponding drive. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

Input device 212 includes a conventional mechanism that permits computer device 200 to receive commands, instructions, or other inputs from a user, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system directly or via a network, such as network 101 (shown in FIG. 1).

As described herein, computing device 200 facilitates the presentation of content, such as an instruction, along with one or more sets of other content, food appliance statistics and operations. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement consistent with the principles of the subject matter disclosed herein are not limited to any specific combination of hardware circuitry and software.

The processor 204 can execute instructions within the computer device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDS, WCDMA, CDMA2000, or GPRS, among others. Such communication may occur, for example, through radiofrequency transceiver. In addition, short-range communication may occur, such as using a Bluetooth®, WiFi, or other such transceiver(s) (not shown). In addition, a GPS (Global Position system) receiving module may provide additional navigation- and location-related wireless data to device 200, which may be used as appropriate by applications running on device 200.

Figure 3:
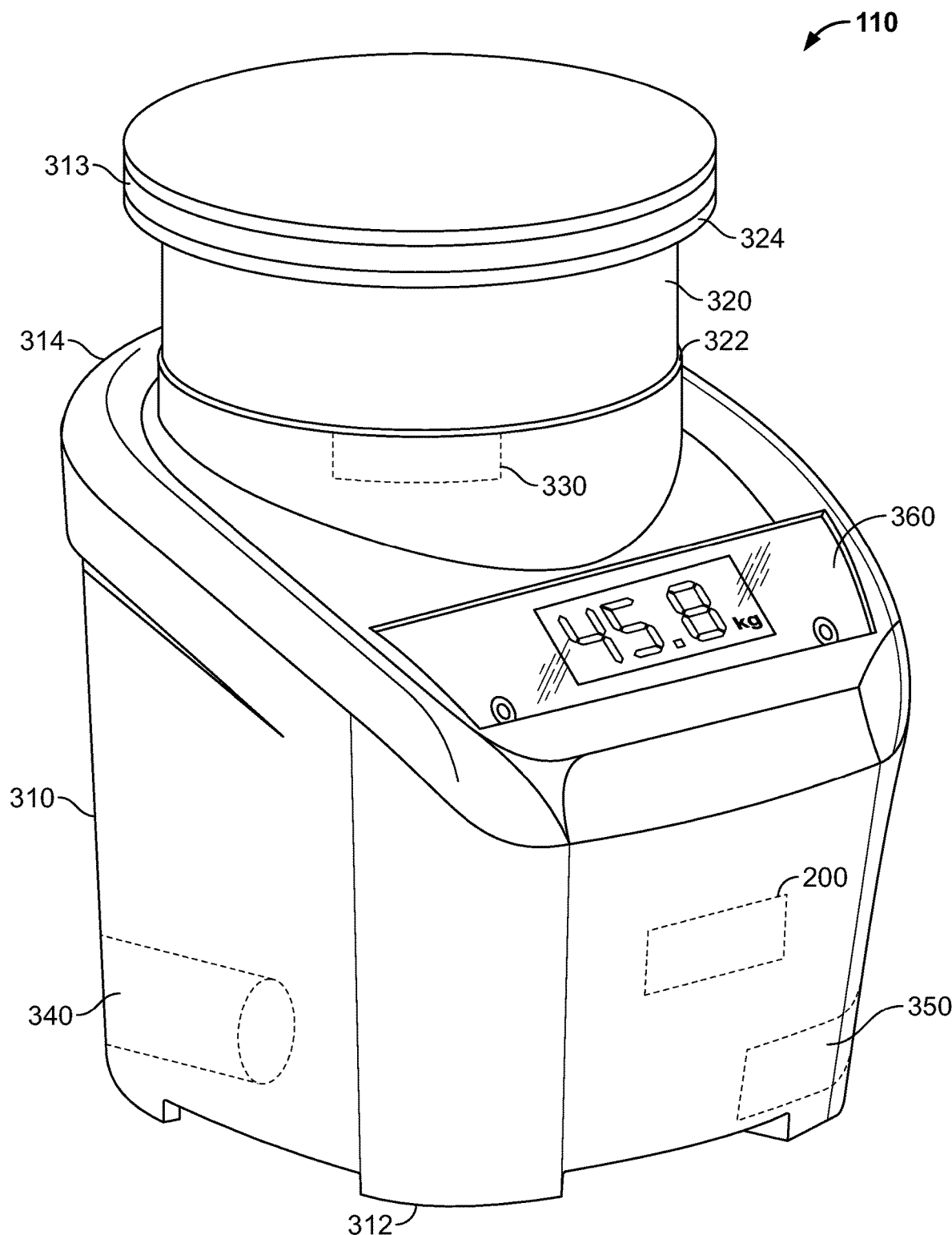
FIG. 3 is a perspective view of the food preparation appliance shown in FIG. 1.

Turning to FIG. 3, the exemplary food preparation appliance 110 of FIG. 1 is shown. The food preparation appliance 110 includes a base 310, an adaptor 320, a weight sensor 330, a motor 340, a computing device 200, a communication component 350, and a display device 360. Although illustrated separately, communication component 350 may be part of computing device 200, such as communication interface 216. A food preparation accessory 313 is coupled to the base 310. It is contemplated that some components illustrated in FIG. 3 may not be present in all embodiments of the food preparation appliance 110. In some embodiments, for example, the food preparation appliance 110 does not include one or more of the display device 360, the communication component 350, and the weight sensor 330. Furthermore, as FIG. 3 is simply an illustration, it is contemplated that additional components not shown in FIG. 3, e.g., gears, wires, controllers, etc., may be present in the food preparation appliance 110.

The base 310 of the food preparation appliance 110 is configured to house the motor 340, the computing device 200, and the communication component 350. The base 310 may be any appropriate shape, size, or configuration, such as generally rectangular or square. The base 310 may be made from a variety of materials, such as but not limited to, molded plastic, metal, and the like. The motor 340 may be located at any appropriate position within the base 310. Additionally, computing device 200 and the communication component 350 may be located at any appropriate position within the base 310. The communication component 350 will be described further herein. The motor may be used in conjunction with the adaptor 320 and with the food preparation accessory 112 of FIG. 1, to blend food items.

The base 310 has a base bottom portion 312 and an opposite base top portion 314. The adaptor 320 is located proximate the base top portion 314 of base 310 and is configured for coupling one or more accessories, such as the accessory 112 or 313, to the base 310. The adaptor 320 may be of any appropriate shape, size, or configuration. The adaptor 320 has an adaptor bottom portion 322 and an adaptor top portion 324. The adaptor bottom portion 322 of adaptor 320 may be permanently or removably attach to the base top portion 314 of the base 310. The adaptor top portion 324 of adaptor 320 is configured to support a food preparation accessory, such as food preparation accessory 313. More particularly, the adaptor top portion 324 of adaptor 320 may be designed to support a food preparation accessory such that the adaptor top portion 324 may be permanently or removably attached to the food preparation accessory.

The weight sensor 330 is located proximate the adaptor bottom portion 322 of the adaptor 320 and is designed to detect a weight applied to the adaptor 320. In the exemplary embodiment, the weight sensor 330 is mechanically coupled to the adaptor 320. Alternatively, the weight sensor may be located at any location from which it can detect a weight applied to the adaptor 320. The weight sensor 330 is configured to generate a signal indicative or proportional to the weight applied to the adaptor 320. In some embodiments, the computing device 200 determines the weight that corresponds to the signal indicative of the weight applied to the adaptor. In other embodiments, the computing device 200 transmits the signal to another device, such as remote communication device 114, without determining the weight indicated by the signal. The weight sensor may be any sensor capable of detecting a weight applied to, for example, the adaptor 320. In one example embodiment, the weight sensor 330 is a piezoelectric weight sensor. It is understood, however, that in other embodiments a different type of weight sensor that converts the load or force acting on it into an electronic signal may be used. Additionally, it is contemplated that a weight may be measured and determined in various units of measurements such as, but not limited to, metric (grams) and imperial (ounces and pounds).

The communication component 350 is used to communicate various types of information, such as a weight applied to the adaptor 320, to components within and/or outside of system 100 of FIG. 1. The display device 360 is used to communicate and/or display various types of information, such as a weight applied to the adaptor 320, to a user. Each of the communication component 350 and the display device 360 is described in further detail below.

Figure 4:
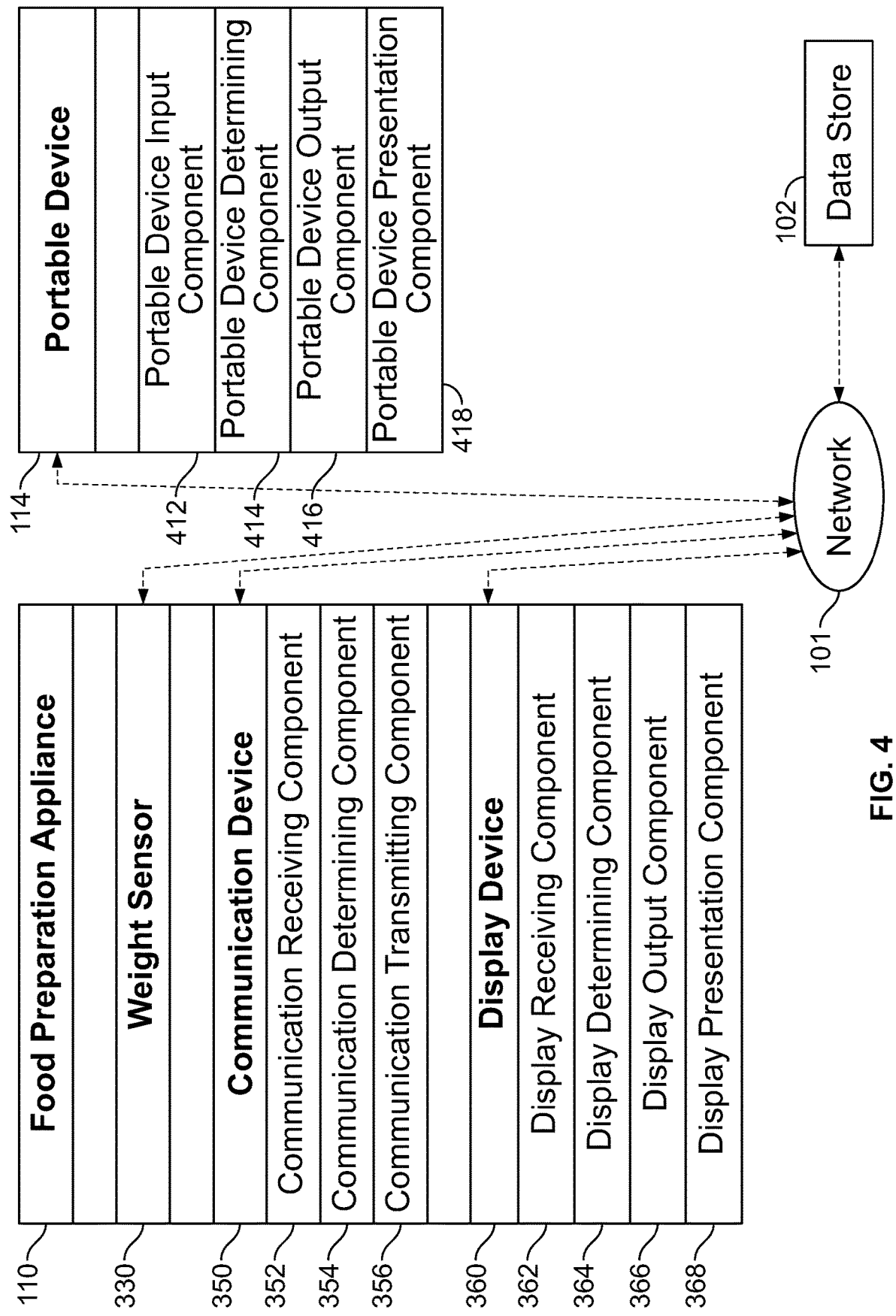
FIG. 4 is functional block diagram of the exemplary system shown in FIG. 1.

Turning to FIG. 4, a functional block diagram of system 100 includes the food preparation appliance 110, the remote communication device 114, and the network 101 and the data store 102. The weight sensor 330, the communication component 350, and the display device 360 of the food preparation appliance 110 are illustrated in FIG. 4. The other structural components of the system 100 shown in FIGS. 1-3, while still included as part of system 100, are not shown in the functional diagram of FIG. 4.

The exemplary communication component 350 includes a communication receiving component 352, a communication determining component 354, and a communication transmitting component 356. Communication receiving component 352 receives data from various components of the food preparation appliance 110, such as the weight sensor 330 and/or the display device 360. The communication receiving component 352 receives weight data from the weight sensor 330. Weight data may include, for example, a signal that is proportional to a magnitude of the weight applied to the adaptor 320. The communication receiving component 352 may also receive various other types of data, such as operational data, statistical data, data from other sensors (not shown), etc. The example communication determining component 354 is configured to determine a weight applied to the adaptor 320 based on the received signal from the weight sensor 330. Communication determining component 354 may also determine a unit of measurement, such as grams or ounces, of the weight applied to the adaptor 320. Communication transmitting component 356 is configured to send an indication of the determined weight to one or more components and/or devices outside of food preparation appliance 110, such as the remote communication device 114 and/or the data store 102. Additionally, communication transmitting component 356 may be configured to transmit an indication of the determined weight to one or more components and/or devices within food preparation appliance 110, such as display presentation component 368 of display device 360.

The display device 360 includes a display receiving component 362, a display determining component 364, a display output component 366, and a display presentation component 368. The display receiving component 362 receives data from various components of food preparation appliance 110, such as the weight sensor 330, the communication component 350, and/or other sensors (not shown). The display receiving component 362 may also retrieve data from the data store 102.

In some embodiments, the display determining component 364 is configured to determine a weight applied to the adaptor 320 based on received weight data. The display determining component 364 may also determine a unit of measurement, such as grams or ounces, of the weight applied to the adaptor 320. The display output component 366 may be configured to send an indication of the determined weight applied to the adaptor 320 to one or more components and/or devices within food preparation appliance 110, such as display presentation component 368. Additionally, display output component may transmit, directly or via communication component 350, an indication of the determined weight to data store 102 and/or remote communication device 114. The display presentation component 368 may be configured to present the weight applied to the adaptor 320 to a user. The display presentation component 368 presents the weight applied to the adaptor 320 in various formats, including but not limited to, audio and/or visual. The display presentation component 368 may also present weight data, operational data, statistical data, and the like.

As described above, the remote communication device 114 may be a mobile phone, a computer tablet, a desktop computer, a television, a radio, a personal digital assistance, a pager, and/or any other suitable device. The remote communication device 114 is configured to receive data, such as mass data, operational data, and statistical data, from the food preparation appliance 110 and present an instruction based, at least in part, on the received data. The remote communication device 114 includes an input component 412, a determining component 414, an output component 416, and/or a presentation component 418. The input component 412 is configured to receive data from one or more components and/or devices within food preparation appliance 110, such as the weight sensor 330, the communication component 350, and/or the display device 360. More particularly, in some embodiments, the input component 412 may be configured to receive a signal from the weight sensor 330 that is proportional to a weight applied to the adaptor 320 (shown in FIG. 3). In additional embodiments, the input component 412 may be configured to receive an indication of a weight applied to the adaptor 320 from the communication transmitting component 356 of the communication component 350 and/or the display output component 366 of the display device 360. Additionally, the input component 412 may be configured to retrieve data from other various components within system 100, such as data store 102, and various components outside of system 100. In some embodiments, the input component 412 retrieves recipe data. Recipe data may include, but is not limited to, recipes stored on the data store 102 and instructions associated with the recipes. An instruction associated with a recipe may include a specific amount of each substance to be added at various times throughout the recipe. The specific amount of the substance may include a target weight and/or a target weight of the substance that may be applied to a component, such as the adaptor 320 of FIG. 3. Additionally, in some aspects, remote communication device input component 412 may be configured to receive a selection of an item, such as a selection of a recipe, by a user.

The remote communication device determining component 414 is configured to determine a weight applied to the adaptor 320 based on the weight data. The remote communication device determining component 414 may also determine a unit of measurement of the weight applied to the adaptor 320. Additionally, the determining component 414 may be configured to determine if the weight applied to the adaptor is substantially equal to the target weight provided in an instruction. In some embodiments, a first weight may be considered substantially equal to a target weight when the first weight is within a 5% margin of error of the target weight. In additional embodiments, a margin of error may be between 5% and 15%. In yet further embodiments, a margin of error may be greater than 15%. In some embodiments, the determining component 414 is configured to determine if the weight applied to the adaptor is greater than the target weight provided in an instruction.

The remote communication device output component 416 is configured to send a request to the remote communication device input component 412 to retrieve data based on determinations made by the remote communication device determining component 414. For example, if the remote communication device determining component 414 determines that the weight applied to the adaptor is substantially equal to and/or greater than the target weight provided in the instruction, the remote communication device output component 414 may send a request to the remote communication device input component 412 to retrieve another instruction. Additionally, the remote communication device output component 416 may be configured to send a request to the remote communication device display component 418 to display specific data, such as the target weight provided in the instruction, the weight applied to the adaptor, operational data, statistical data, and/or the instruction. The remote communication device output component 416 may also be configured to send data to the data store 102.

The remote communication device presentation component 418 is configured to present data to a user in various formats, including by not limited to, audio and/or visual formats. The remote communication device presentation component 418 may present a weight applied to the adaptor 320, recipes, instructions associated with a recipe, the target weight provided in the instruction, and the like.

The remote communication device 114 may be used in conjunction with the food preparation appliance 110 to assist a user in making a food item. For example, a user may utilize the remote communication device 114 and the food preparation appliance 110 to make a food item, such as a banana smoothie. In such an example, the remote communication device input component 412 retrieves a banana smoothie recipe and an associated first instruction from the data store 102. The first instruction includes a specific amount of milk to be added. Additionally, the first instruction includes a first target weight of the milk to be added. Upon the milk being added to the food preparation accessory 112 located on the adaptor 320 of the food preparation appliance 110, the weight sensor 330 generates a signal indicative of the weight of milk. The weight sensor 330 sends the signal to communication receiving component 352 of the communication component 350, the display receiving component 362 of display device 360, and/or data store 102.

Upon the communication receiving component 352 receiving the signal from the weight sensor 330, communication determining component 354 determines the weight applied to the adaptor 320 and/or a unit of measurement of the weight of milk applied to the adaptor 320. The communication transmitting component 356 then sends an indication of the determined weight of the milk applied to the adaptor 320 to remote communication device input component 412 and/or the display presentation component 368.

When the remote communication device input component 412 receives the indication of the weight of the milk, the remote communication device determining component 414 determines if the weight of the milk is substantially equal to the first target weight associated with the first instruction. If the weight of the milk is substantially equal to the first target weight, then the remote communication device output component 416 sends a request for the remote communication device input component 412 retrieve a second instruction. The second instruction may be associated with the first instruction and be chronologically ordered according to the recipe. The remote communication device display component 418 displays the second instruction, which may be, for example, an instruction to add a specific amount of bananas. As this process is just an example, other methods, processes, and flows of information are contemplated.

Figure 5:
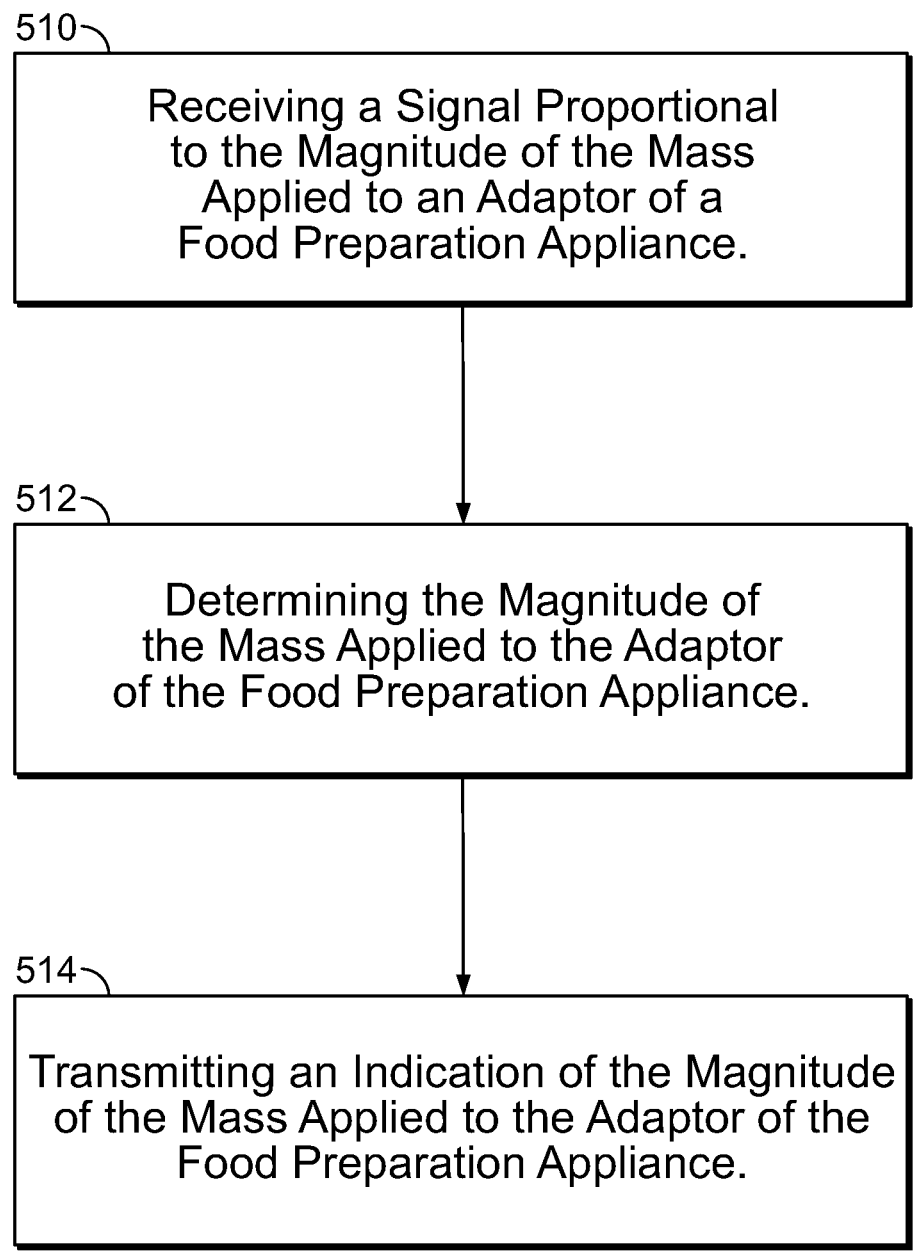
FIG. 5 is a flow diagram of an exemplary method for transmitting data associated with a weight.

With reference to FIG. 5, a flow diagram is shown illustrating an exemplary method 500 for transmitting data associated with a weight, in accordance with aspects of this disclosure. At 510, a signal that is proportional to the weight applied to an adaptor of a food preparation appliance is received. The weight applied to the adaptor of the food preparation appliance is determined at 512 based, at least in part, on the signal. An indication of the weight applied to the adaptor of the food preparation appliance is transmitted 514 to a remote communication device.

Figure 6:
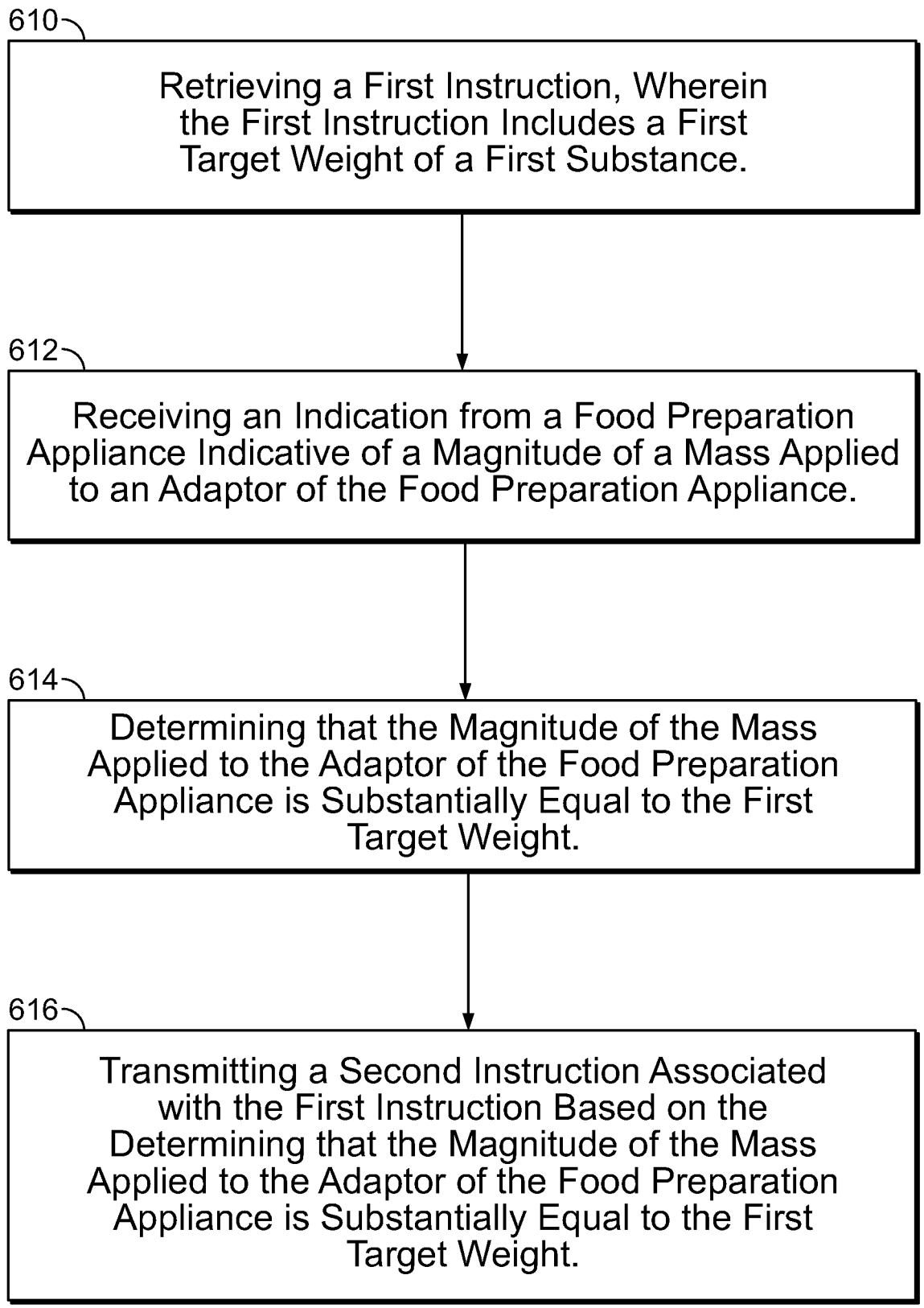
FIG. 6 is a flow diagram of an exemplary method for displaying an instruction.

FIG. 6 is a flow diagram of an exemplary method 600 for displaying an instruction. At 610, a first instruction is retrieved. The first instruction includes a first target weight of a first substance. An indication from a food preparation appliance indicative of a weight applied to an adaptor of the food preparation appliance is received at 612. A determination that the weight applied to the adaptor of the food preparation appliance is substantially equal to the first target weight is made at 614. At 616, a second instruction associated with the first instruction and based on the determining that the weight applied to the adaptor of the food preparation appliance is substantially equal to the first target weight is transmitted. It is contemplated that several instructions, and/or as many instructions as necessary for a recipe or other instruction types may be displayed utilizing aspects described herein.

Figure 7:
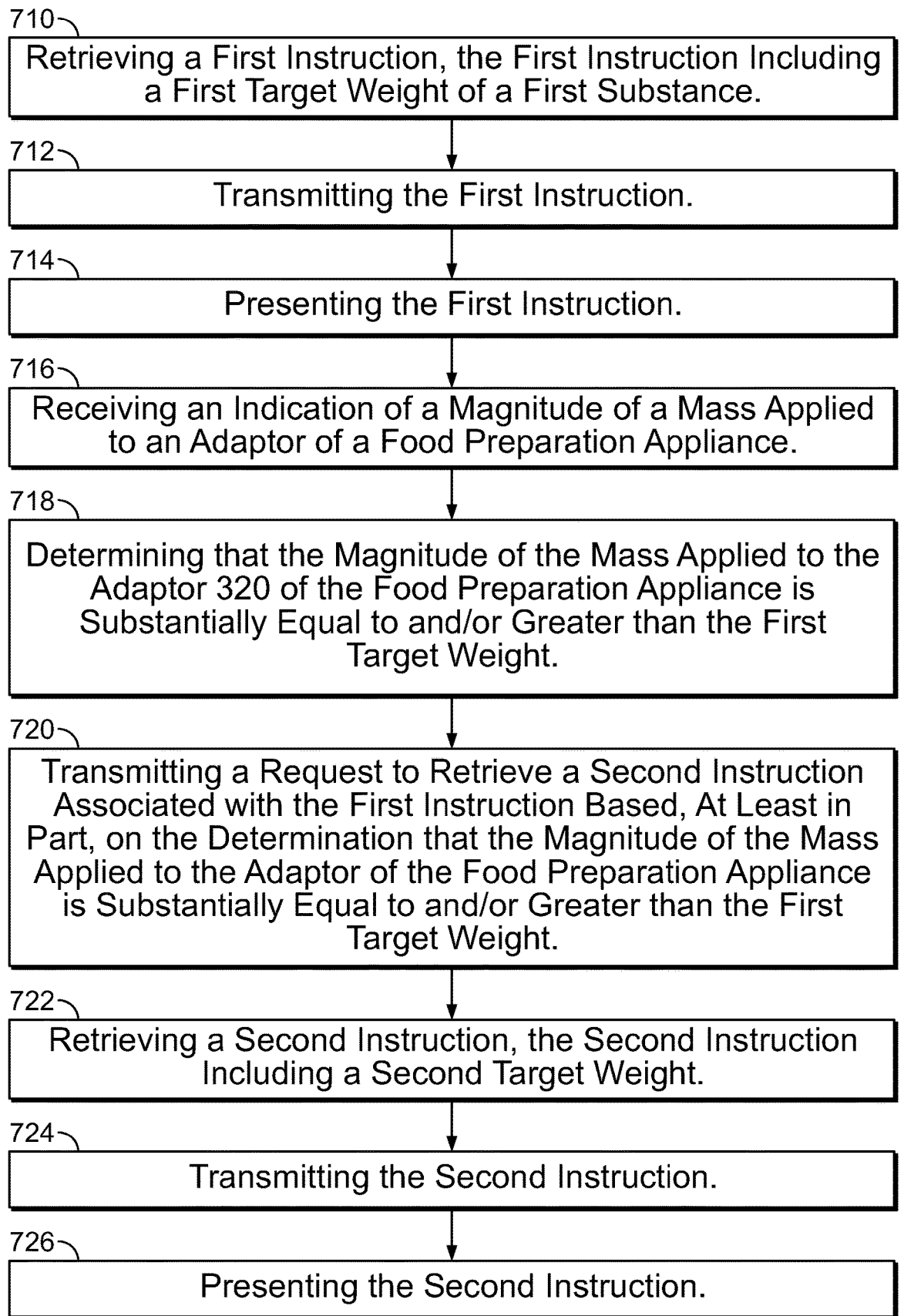
FIG. 7 is a flow diagram of an exemplary process for providing instructions.

An exemplary process of providing instructions is shown in FIG. 7. At 710, a first instruction is retrieved by remote communication device input component 412 from the data store 102. The first instruction includes a first target weight of a first substance. At 712, the first instruction is transmitted by the remote communication device output component 416 to remote communication device presentation component 418. The first instruction is presented to a user at 714 by remote communication device presentation component 418. At 716, an indication of a weight applied to the adaptor 320 of the food preparation appliance 110 is received by remote communication device input component 412. The indication may be received from the weight sensor 330, the communication transmitting component 356, and/or the display output component 366. At block 718, a determination that the weight applied to the adaptor 320 of the food preparation appliance 110 is substantially equal to and/or greater than the first target weight is made by the remote communication device determining component 416. At 720, the remote communication device output component 416 sends a request to the remote communication device input component 412 to retrieve a second instruction associated with the first instruction based, at least in part, on the determination that the weight applied to the adaptor 320 of the food preparation appliance 110 is substantially equal to and/or greater than the first target weight. The remote communication device input component 412 retrieves the second instruction at 722. The second instruction includes a second target weight of a second substance. At 724, the second instruction is transmitted by the remote communication device output component 416 to remote communication device presentation component 418. At block 726, the second instruction is presented to the user by remote communication device presentation component 418.

Figure 8C:
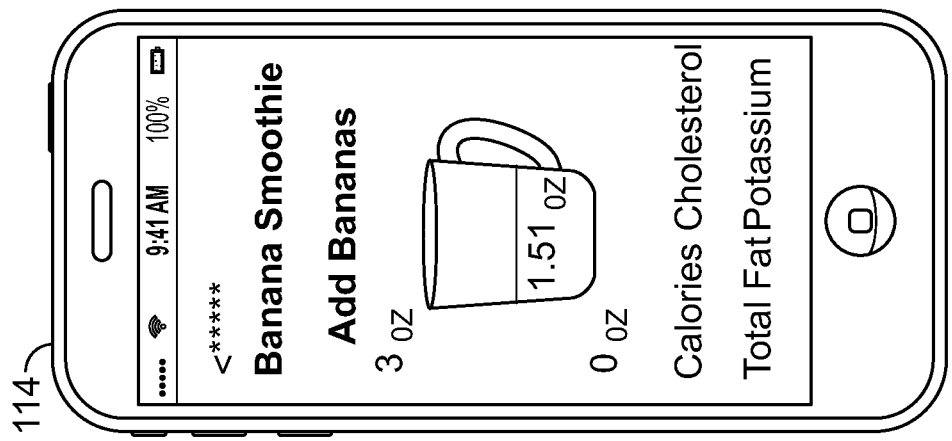
FIG. 8C is another exemplary display.
Figure 8B:
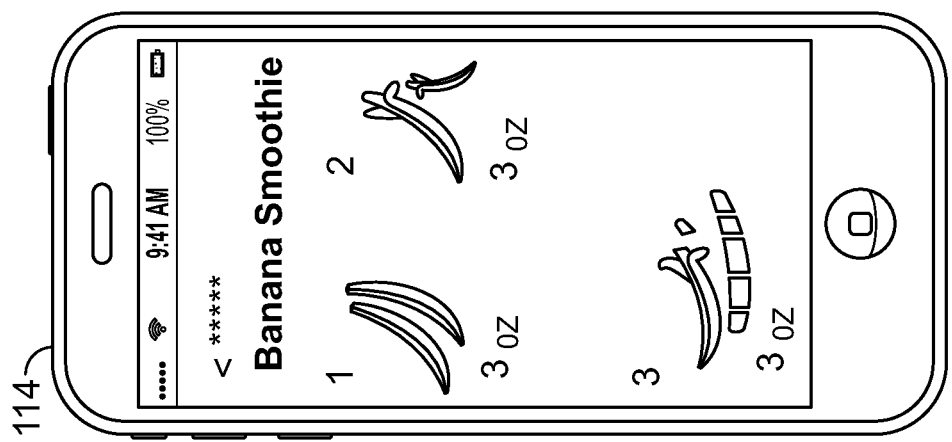
FIG. 8B is another exemplary display.
Figure 8A:
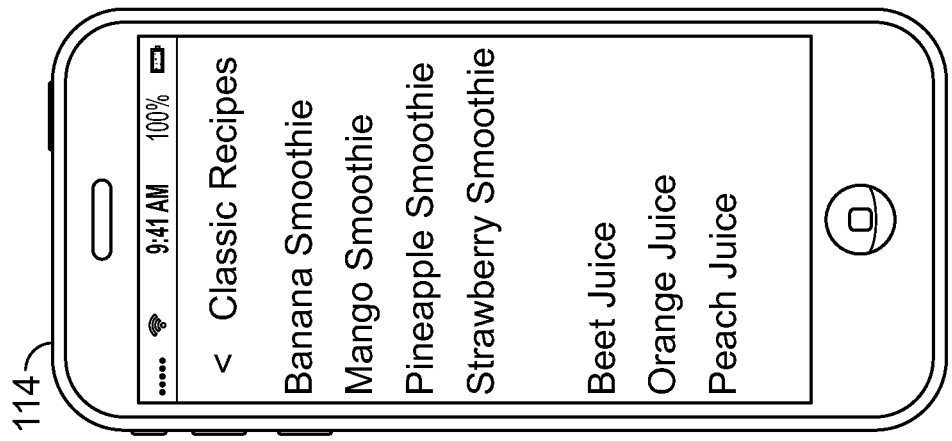
FIG. 8A is an exemplary display on the remote communication device shown in FIG. 1 during an exemplary process for assisting a user in creating a food dish utilizing the food preparation appliance shown in FIG. 1.

FIGS. 8A-8E illustrate exemplary displays on the remote communication device 114 during an exemplary process for assisting a user in creating a food dish utilizing the system 100. In FIG. 8A, the remote communication device 114 presents a variety of recipes for a user to choose from. Upon a selection of at least one of the recipes, a list of substances associated with the selected recipe and the amount of each that is required is presented to the user, as shown in FIG. 8B. When the user selects to start the recipe, instructions are presented to the user to add the specific amounts of each substance. As the user adds a first substance, such as bananas, an updated amount of the substance is presented. For example, as shown in FIG. 8C, the user is instructed to add three ounces of bananas and the current amount of bananas, i.e., 1.51 ounces of bananas, is displayed on the remote communication device 114. When the user has provided the necessary amount of the first substance, an option is presented to the user to continue to the next instruction. As shown in FIG. 8D, when the weight of the bananas is substantially equal to and/or greater than the required 3 ounces, a next ingredient button is illuminated. When the user selects the next ingredient button, a second instruction is presented. For example, as shown in FIG. 8E, an instruction to add three ounces of milk is presented. The system will continue to step the user through the recipe using the portable deice 114 until the recipe is completed or the user selects to cancel the recipe.

Technical effects of the methods, systems, and computer-readable media described herein include at least one of: (a) receiving a signal proportional to the weight applied to an adaptor of the food preparation appliance; (b) determining the weight applied to the adaptor of the food preparation appliance based, at least in part, on the signal; and (c) transmitting an indication of the weight to the remote communication device.

Additional technical effects of the methods, systems, and computer-readable media described herein include at least one of: (a) retrieving a first instruction, the first instruction including a first target weight of a first substance; (b) receiving a measurement from a food preparation appliance indicative of a weight applied to an adaptor of the food preparation appliance; (c) determining that the weight applied to the adaptor of the food preparation appliance is substantially equal to the target weight; and transmitting a second instruction associated with the first instruction and based on the determining that the weight applied to the adaptor of the food preparation appliance is substantially equal to the target weight.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although certain embodiments of this disclosure have been described above with a certain degree of particularity, those skilled in the art could make numerous alterations to the disclosed embodiments without departing from the spirit of scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations particularly as to the position, orientation or use of the disclosure. Joinder references (e.g., attached, coupled, connected, and the like) are to be construed broadly and may include intermediate members between a connection of elements relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the disclosure as defined in the appended claims.

When introducing elements of the present disclosure or the various versions, embodiment(s) or aspects thereof, the articles "a", "an", "the" and "said" are intended to mean that there are one or more elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above without departing from the scope of the disclosure, it is intended that all matter contained in the above description and shown in the accompanying drawings shall be interpreted as illustrative and not in a limiting sense.

What is claimed is:

1. A method comprising:
   generating, by a weight sensor of a food preparation appliance, a weight signal;
      wherein the food preparation appliance comprises:
         a base comprising:
            a housing with a top portion; and
            a motor contained within the housing;
         a food preparation accessory;
         an adapter having:
            a bottom portion configured to be removably attached to the top portion of the base of the food preparation appliance; and
            a top portion configured to receive and support the food preparation accessory thereon, wherein the food preparation accessory is removable from the top portion of the adapter; and
         wherein the weight sensor is mechanically coupled to the bottom portion of the adapter and the weight signal is indicative of a weight of food contained in the food preparation accessory and applied to the adapter;
   determining the weight applied to the adapter based at least in part on the weight signal; and
   transmitting, by a communication component, an indication of the weight to a remote communication device.

2. The method of claim 1, further comprising receiving food by the food preparation accessory.

3. The method of claim 1, further comprising causing the remote communication device to display a first instruction, wherein the first instruction includes a first target weight of a first substance.

4. The method of claim 3, further comprising determining when the weight of the first substance applied to the adapter is substantially equal to the first target weight.

5. The method of claim 4, further comprising causing the remote communication device to display a second instruction associated with the first instruction, wherein the second instruction includes a second target weight of a second substance.

6. The method of claim 1, further comprising displaying the weight applied to the adapter on a display device of the food preparation appliance.

7. The method of claim 1, further comprising coupling the food preparation accessory to the adapter.

8. A method comprising:
   generating, by a weight sensor of a food preparation appliance, a weight signal;

wherein the food preparation appliance comprises:
a base comprising:
a housing with a top portion; and
a motor contained within the housing;
a food preparation accessory;
an adapter having:
a bottom portion configured to be removably attached to the top portion of the base of the food preparation appliance; and
a top portion configured to receive and support the food preparation accessory thereon, wherein the food preparation accessory is removable from the top portion of the adapter; and
wherein the weight sensor is mechanically coupled to the bottom portion of the adapter and the weight signal is indicative of a weight of food contained in the food preparation accessory and applied to the adapter;
determining the weight applied to the adapter based, at least in part, on the weight signal detected by the weight sensor; and
displaying the weight applied to the adapter on a display device of the food preparation appliance.

9. The method of claim 8, further comprising transmitting, by a communication component, an indication of the weight to a remote communication device.

10. The method of claim 9, further comprising causing the remote communication device to display the weight based on the indication of the weight.

11. The method of claim 8, further comprising receiving food by the food preparation accessory.

12. The method of claim 8, further comprising causing a remote communication device to display a first instruction, wherein the first instruction includes a first target weight of the food.

13. The method of claim 12, further comprising determining when the weight of the food applied to the adapter is substantially equal to the first target weight.

14. The method of claim 13, further comprising causing the remote communication device to display a second instruction associated with the first instruction, wherein the second instruction includes a second target weight of a second food.

15. A food preparation appliance comprising:
a base comprising:
a housing with a top portion; and
a motor contained within the housing;
a food preparation accessory;
an adapter having:
a bottom portion configured to be removably attached to the top portion of the base of the food preparation appliance; and
a top portion configured to receive and support the food preparation accessory thereon, wherein the food preparation accessory is removable from the top portion of the adapter; and
a weight sensor mechanically coupled to the bottom portion of the adapter, the weight sensor configured to detect a weight applied by the food preparation accessory and to generate a weight signal proportional to the weight applied by the food preparation accessory.

16. The food preparation appliance of claim 15, wherein the adapter is operably connected to the motor.

17. The food preparation appliance of claim 15, further comprising a communication component configured to transmit data associated with the weight detected by the weight sensor to a remote communication device.

18. The food preparation appliance of claim 15, further comprising:
a processor; and
a memory coupled to the processor, the memory configured to store instructions that when executed by the processor, cause the food preparation appliance to:
generate, by the weight sensor, the weight signal proportional to a weight of food applied to the adapter;
determine the weight applied to the adapter based at least in part on the weight signal; and
transmit, by a communication component, an indication of the weight to a remote communication device.

19. The food preparation appliance of claim 18, wherein the food preparation appliance is further caused to display the weight applied to the adapter on a display device of the food preparation appliance.

* * * * *